A. C. MACARTNEY.
TEAT CUP.
APPLICATION FILED AUG. 23, 1913.
1,146,584.
Patented July 13, 1915.
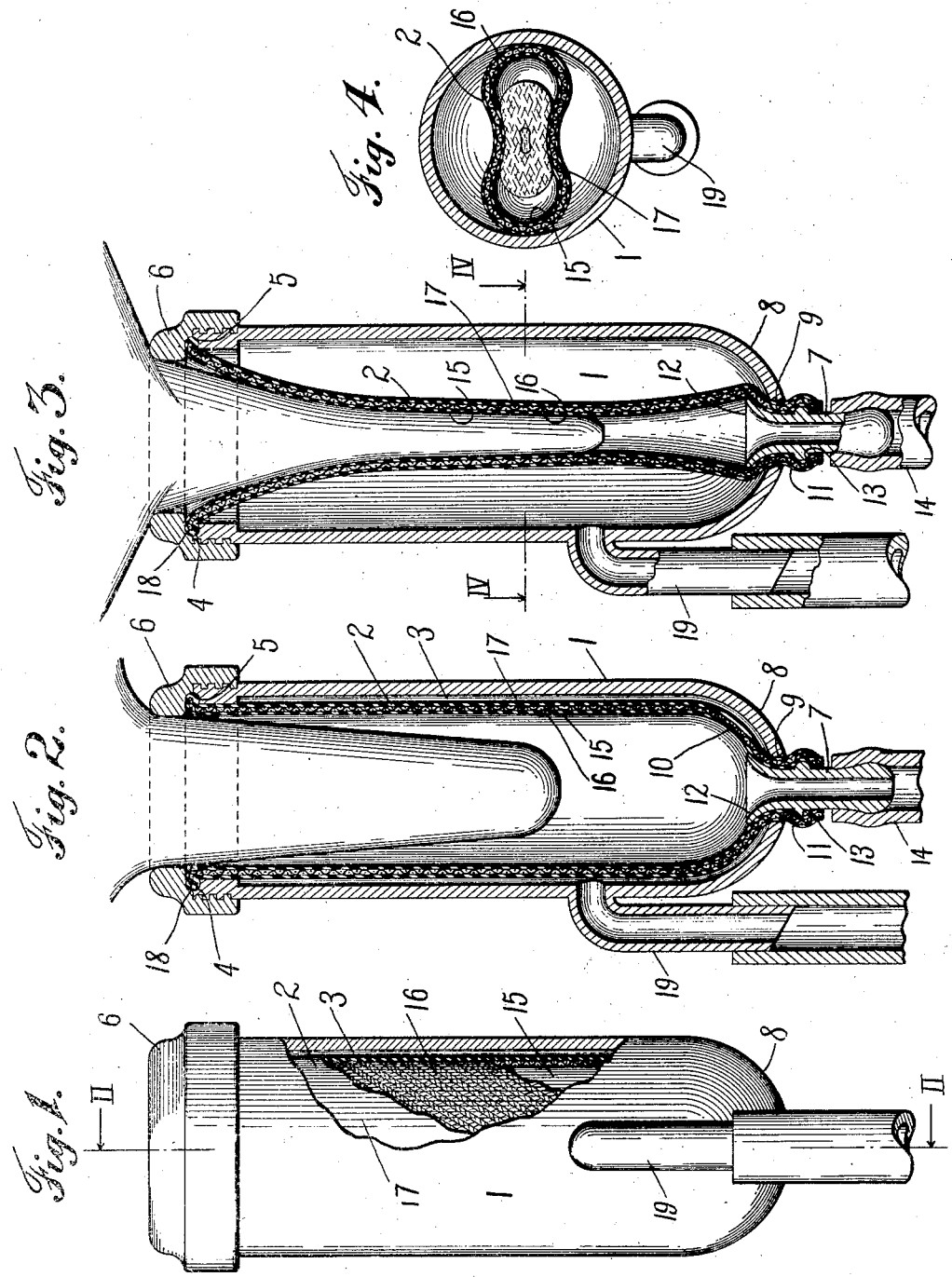

UNITED STATES PATENT OFFICE.

ARTHUR CHICHESTER MACARTNEY, OF BLOOMFIELD, NEW JERSEY, ASSIGNOR TO EMPIRE CREAM SEPARATOR COMPANY, OF BLOOMFIELD, NEW JERSEY, A CORPORATION OF NEW JERSEY.

TEAT-CUP.

1,146,584.  Specification of Letters Patent.  Patented July 13, 1915.

Application filed August 23, 1913. Serial No. 786,286.

*To all whom it may concern:*

Be it known that I, ARTHUR CHICHESTER MACARTNEY, a subject of the King of Great Britain, residing at Bloomfield, in the county of Essex and State of New Jersey, have invented certain new and useful Improvements in Teat-Cups for Milking-Machines, of which the following is a specification.

This invention relates to improvements in the construction of teat cups, such as are used in connection with machines for milking cows and its objects are to provide a structure for this purpose which shall efficiently perform its intended function, which shall be of simple construction so that it may be readily put together and taken apart and easily kept in a clean and sanitary condition and which shall be durable.

In a well-known class of teat cups, which have been extensively used with milking machines, the cup is provided with a flexible lining or "inflation" as it is sometimes called, which engages the teat and which is caused to pulsate or expand and contract by the action of compressed air or suction, or both. These flexible linings, which have heretofore commonly been made of rubber, have, however, been the weak point in teat cups of this character, as they have been unable to withstand for a reasonable length of time, the continued flexure and distortion to which they were subjected and have been a constant source of annoyance and expense to users of milking machines.

An important object of the present invention is the provision of a reinforced lining or inflation of superior strength and durability without losing its necessary flexibility.

I have shown in the drawing accompanying and forming a part of the specification and will describe in detail one preferred embodiment of my invention, but I do not wish to be understood as limiting myself to such specific embodiment, but intend to cover my invention broadly and in its various applications.

In the drawings: Figure 1 is a side elevation of a teat cup embodying one form of my invention, parts of the outer casing of the cup and of the different coats of the lining being broken away. Fig. 2 is a vertical section through the teat cup shown in Fig. 1 taken on line II—II of Fig. 1 and showing the cup applied to a cow's teat. Fig. 3 is a view similar to Fig. 2 showing the lining collapsed or contracted, so as to compress the cow's teat. Fig. 4 is a horizontal section on line IV—IV of Fig. 3.

Referring to the drawings in detail, the numeral 1 designates the outer casing of the teat cup, which is preferably formed of metal or other relatively rigid material. Within this casing is mounted a flexible lining or inflation 2, a space 3 being preferably provided between the lining and the inside of the casing. The lining is secured at its upper end to the casing in any suitable manner. As shown, the upper end of the lining is provided with a bead or flange 4, preferably of rounded cross-section, and which is partially received within a groove or recess 5 formed in the upper end of the casing and firmly gripped and locked in position by means of a cap 6 attached to the end of the casing. The upper end of the casing and cap are preferably provided with engaging screw threads for this purpose. A suitable connection is made to the interior of the lining at or near its lower end for the purpose of exhausting the air from the teat cup so as to draw the milk out of the teat and for the purpose of conducting away the milk discharged into the teat cup. As shown a nipple 7 enters the bottom of the lining for this purpose, this nipple also serving in the particular embodiment of the invention illustrated, to lock the lower end of the lining to the casing of the cup. The lower end 8 of the casing has an opening 9 therein. The lining 2 is contracted at its lower end, preferably in somewhat rounded form, as indicated at 10. At its extreme end the lining is provided with a tubular extension portion 11, which is adapted to surround the upper end of the nipple 7 and to project out of the opening 9 in the bottom of the casing. The nipple 7, is provided with an enlarged or flaring upper end 12, which spreads out inside of the lining, and with an annular rib or enlargement 13 which distends the tubular extension 11 of the lining below the bottom of the casing and so locks the lower end of the lining firmly in position, preventing the extension portion 11 from being drawn up through the hole 9 in the bottom of the casing during the operation of the device.

The rib 13 is made of such diameter that it can just be forced through the hole 9 with the lining squeezed between it and the walls of the hole. The lining will yield sufficiently to permit this operation to be performed, but its elasticity is such that it will hold the nipple firmly in position and be itself locked in position as soon as the rib 13 is forced past the bottom of the casing. A strong and tight connection between the nipple, lining and casing is thus secured, which, however is very easily made and also very easily disconnected. For the latter purpose it is simply necessary to force the nipple and projecting portion 11 of the lining up through the hole 9 or to simply pull vigorously on the upper part of the lining. It will be seen that this connection requires neither cement nor screw clamps, nor extra parts of any kind. The lower end of the nipple 7 is preferably formed for engagement with the hose 14 through which the suction is applied to the interior of the lining and through which the milk is drawn off. It will be seen that the lining is connected to the casing only near the center of the bottom thereof, so that it curves out or hangs loosely at each side or all around this connection. Thus the lining is not drawn taut between its connection with the upper edge of the casing and its central bottom connection, but is provided with a certain amount of slack so to speak. This slack permits the lining to collapse and compress or support the teat as shown in Figs. 3 and 4 without requiring undue stretching of the material thereof. This construction of the lining is of particular importance when the lining embodies a fabric reinforce as will be hereinafter described for the reason that such a reinforce may not permit free stretching of the lining. The rounded or slack form of the lining obviates the necessity for such stretching.

Linings or inflations for teat cups have heretofore usually been made of rubber, as such material is flexible and elastic, and impervious and therefore may be kept in a sanitary condition. Rubber, however, is not sufficiently strong to withstand the continued flexure and stretching to which the lining of a teat cup is necessarily subjected and much difficulty has been experienced heretofore with the frequent rupture and rapid wearing out of rubber linings. I have provided an improved construction of lining which overcomes these difficulties, my improvement consisting generally in the use of a fabric tube preferably woven seamless and fashioned in the desired shape of the lining. This fabric tube preferably constitutes the chief strength giving member of the lining though it may constitute a mere reinforcement of a rubber lining. In its preferred form, the fabric tube is coated or covered upon one or both sides with rubber or other suitable material to render it air tight and non absorbent. As shown in the drawings, the teat cup lining comprises an inner layer 15 of rubber, an intermediate layer 16 of fabric and an outer layer 17 of rubber. The middle layer 16 is preferably in the form of a seamless woven, braided or knitted fabric tube which is fashioned in the weaving or otherwise shaped to the outline desired for the cup lining. At its upper end the fabric preferably extends out into the bead 4 as indicated at 18 so as to strengthen the bead and prevent it from tearing off. Near its lower end the fabric tube is decreased in diameter so as to form the curved portion 10 of the lining while the lower end of the fabric tube is contracted into the tubular extension 11 of the lining. By making the fabric as a seamless tube there are no seams or ridges to irritate the cow's teat and there is no weak point in the lining to give way. The tubular fabric may also be shaped or fashioned so as to give exactly the contour desired, thus rendering it possible to carry the reinforce throughout all portions of and to the extreme ends of the lining. This is of particular importance, as it is at the ends of the lining where the latter is connected to the casing that the greatest strains and sharpest flexure occur and it is at these points that the linings heretofore used have most commonly failed. By making the fabric portion of the lining of a suitable weave it may be given great flexibility and may have an elasticity almost as great as that of the rubber itself. This is particularly true where a braided or knitted fabric is used. The fabric and rubber may be secured together in any suitable manner, preferably by vulcanization.

My improved fashioned seamless tubular fabric reinforce may obviously be utilized in teat cups of other forms than that illustrated such as single chamber cups having flexible bodies as well as in the linings or flexible members of multiple chamber cups of various forms.

Teat cups embodying some or all of the features of the present invention may be applied to milking machines of various types. The form illustrated is particularly intended for use with milking machines in which a constant vacuum is maintained within the lining of the teat cup by continuous suction applied to the pipe 14. This constant vacuum serves to draw the milk from the teat and to maintain the teat cup in position thereon. For the purpose of causing the teat cup lining to pulsate so as to alternately support or compress and relieve the teat a connection is made to the casing of the cup through which air may be alternately exhausted from or admitted to the space 3 between the lining and the casing. As shown a pipe 19 is connected to the side of the casing for this purpose. When air is exhausted from the casing through the pipe 19 so as to equalize the vacuum on the two sides of the lining, the lining occupies its normal position as shown in Fig. 2. When air at atmospheric pressure is admitted to the casing through the pipe 19 it permits the collapse or contraction of the lining as shown in Figs. 3 and 4, by the suction constantly maintained in the interior of the lining. The particular form which the lining will take when collapsed is indeterminate, Figs. 3 and 4 being intended merely to illustrate this action more or less diagrammatically. The teat cup may be operated in other ways, as for instance by applying suction to the interior thereof through the pipe 14 intermittently or by applying pressure greater than atmospheric through the pipe 19, or by a combination of these agencies, as may be desired.

Having thus described one preferred embodiment of my invention as illustrative of the application of the principles thereof, but without intending to limit myself to the specific features of said embodiment, what I claim and desire to secure by Letters Patent is:

1. A flexible lining for teat cups comprising a seamless fabric tube lined with impervious material and adapted to receive a teat within the hollow thereof.

2. A flexible lining for teat cups comprising a rubber tube adapted to receive a teat within the hollow thereof, and having portions at its upper and lower extremities for attachment to a teat cup casing, said rubber tube having a flexible fabric reinforcement extending throughout the entire circumference of the tube and into the attaching portions at the extremities thereof.

3. A flexible lining for teat cups having an attaching bead or flange at the upper end thereof and a flexible fabric reinforcing member extending into said bead.

4. A flexible lining for teat cups having an extension of reduced diameter at its lower end and a flexible fabric reinforcement extending into said extension.

5. A flexible lining for teat cups comprising a tubular body portion and a lower end portion of reduced diameter and a flexible fabric reinforcing member extending into and reinforcing both of said portions.

6. A flexible lining for teat cups having portions of different diameters and a reinforcing member therefor comprising a flexible fabric tube shaped to the contour of said lining.

7. A teat cup comprising a rigid casing and a flexible tubular lining extending longitudinally thereof and removably secured at its ends within the casing, said lining comprising an impervious inner face and a flexible tubular knitted fabric reinforcement.

8. A teat cup comprising a rigid casing and a flexible inner cup adapted to receive the teat, said inner cup comprising rubber united with a tubular seamless fabric reinforcement.

9. A teat cup having a rigid casing, a cap secured to said casing, and a flexible lining of fabric and rubber, said lining having a bead or flange adapted to be clamped between said cap and casing, the fabric portion of said lining extending out into said bead or flange.

10. The combination in a teat cup of a rigid casing with a hole in the bottom thereof of less diameter than said casing, a flexible lining mounted in said casing and secured to the same at its upper end, said lining being gradually reduced in diameter toward its lower end and terminating in a tubular extension protruding through the hole in the bottom of said casing and a nipple extending through said protuberant portion of the lining and said hole in the casing into said casing and having an enlarged upper end, the diameter of which is materially less than the maximum inner diameter of said lining.

11. In a teat cup, the combination with a rigid casing, of a flexible, fabric-reinforced lining secured at its ends to said casing and shaped to provide slack between its points of connection to the casing.

12. In a teat cup, the combination with a rigid casing, of a flexible lining secured at its ends to said casing, the lower part of said lining being of rounded form and being secured to the casing near the center only of the rounded bottom part, whereby slack is provided to permit pulsation of the lining, the lining having a fabric body portion extending between the points of connection of the same to the casing.

13. In a teat cup, the combination of a rigid casing having a hole in the bottom thereof, a flexible lining mounted in said casing and secured at its upper end to said casing, the lower end of said lining protruding through the hole in said casing, and a nipple inserted into the protruding part of said lining and extending within said casing, said nipple having an enlarged portion within the casing and an enlarged portion outside of said casing, the diameter of said second enlarged portion being such that it will pass through the hole in the bottom of the casing when inclosed within the protuberant portion of the lining, said second enlarged portion acting to dilate the protruding part of the lining and secure the lining to the casing when it has been passed through the hole in said casing.

14. In a teat cup, the combination with a rigid casing having a hole in the bottom thereof of materially less diameter than the inner diameter of the casing, a flexible lining in said casing secured to the same at its upper end, said lining having a body portion of nearly the diameter of the casing extending to near the lower end of the casing and having a rounded lower end with a discharge opening therein of materially less diameter than the inner diameter of the body portion of the casing, and a nipple extending through the hole in the casing and the hole in the bottom of the lining and clamping the central part of the bottom of the lining to the casing, the diameter of the portion of the lining held to the casing being materially less than the diameter of the body portion of the lining whereby slack is provided in the lining permitting the same to collapse between its points of connection with the casing at its upper and lower ends.

In witness whereof I have hereunto set my hand in the presence of two subscribing witnesses.

ARTHUR CHICHESTER MACARTNEY

Witnesses:
EDMUND QUINCY MOSES,
LAURA E. SMITH.